United States Patent [19]

Jackson

[11] Patent Number: 5,771,037

[45] Date of Patent: Jun. 23, 1998

[54] COMPUTER DISPLAY CURSOR CONTROLLER

[75] Inventor: Robert E. Jackson, Rolling Hills Estates, Calif.

[73] Assignee: Altra, Rawlins, Wyo.

[21] Appl. No.: 505,916

[22] Filed: Jul. 24, 1995

[51] Int. Cl.$^6$ ................................................. G09G 5/08
[52] U.S. Cl. ........................... 345/157; 345/158; 345/145
[58] Field of Search ................................... 345/157, 158, 345/161, 166, 156, 145, 146

[56] References Cited

U.S. PATENT DOCUMENTS

| | | |
|---|---|---|
| 4,782,327 | 11/1988 | Kley et al. . |
| 4,880,968 | 11/1989 | Kwang-Chien ......................... 345/166 |
| 4,935,728 | 6/1990 | Kley et al. . |
| 5,288,993 | 2/1994 | Bidiville et al. . |
| 5,296,846 | 3/1994 | Ledley . |
| 5,327,161 | 7/1994 | Logan et al. ........................... 345/173 |
| 5,358,343 | 10/1994 | Klauber . |
| 5,367,631 | 11/1994 | Levy . |
| 5,376,946 | 12/1994 | Mikan . |
| 5,379,053 | 1/1995 | Steinberg . |
| 5,407,285 | 4/1995 | Franz . |

Primary Examiner—Richard Hjerpe
Assistant Examiner—Xu-Ming Wu
Attorney, Agent, or Firm—Flehr Hohbach Test Albritton & Herbert LLP

[57] ABSTRACT

A controller for controlling a computer display cursor includes an arena having a predefined optical grid. A puck handle is configured to move a puck on the optical grid and to reflect optical signals to the grid regarding the position of the puck on optical grid. The optical grid defines the resolution of the puck movements and positions that can be ascertained. Gratings formed by undulations in transparent walls provide an optical puck position signal in response to the puck position. A processor is coupled to the optical grid and is configured to receive the puck position signal and to generate a cursor position signal. To generate the cursor position signal, the processor may perform a conversion function based on predetermined criteria. The processor transmits the cursor position signal to a computer having a predefined display size, which displays the cursor at a respective position. Moreover, the processor may maintain puck movement parameters including puck velocity to generate a continuous movement signal when the puck is moved into an edge position. The processor may also may identify if the puck is positioned in a number of macro locations that are associated with user-selectable tasks.

30 Claims, 11 Drawing Sheets

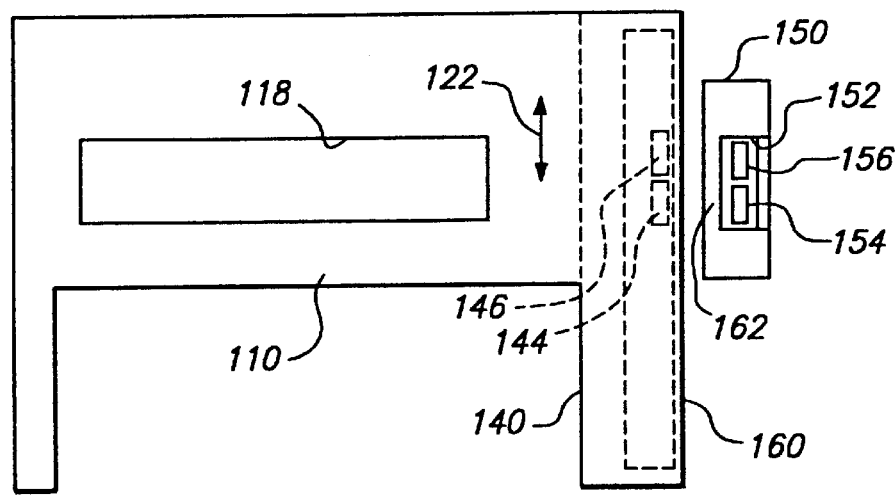
FIG. 6
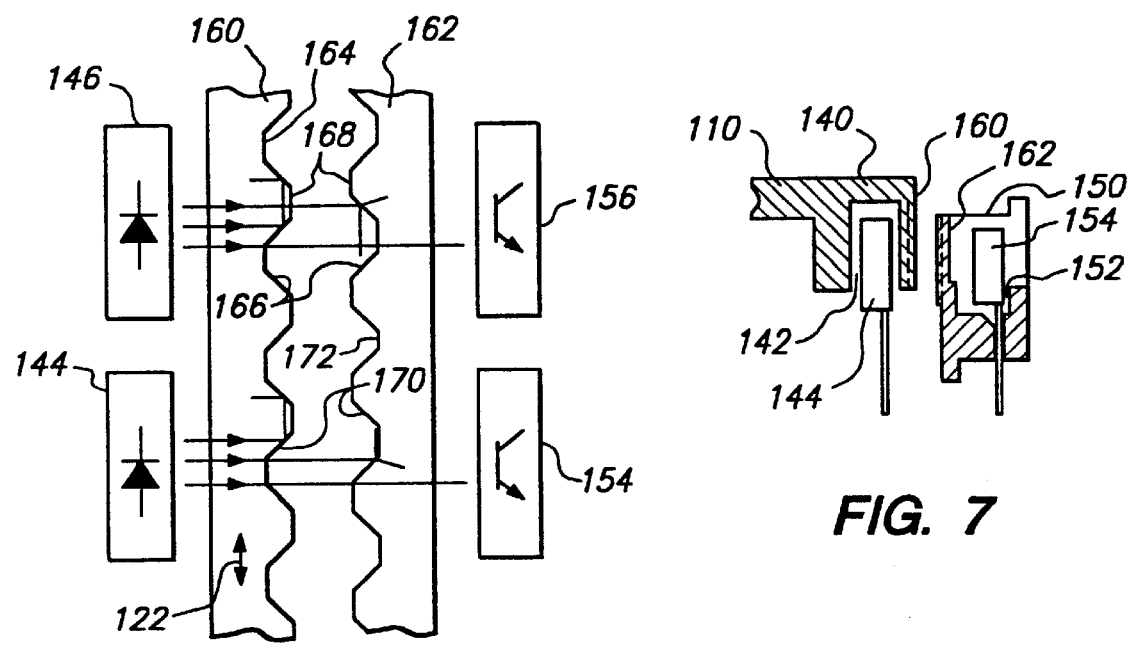
FIG. 8
FIG. 7

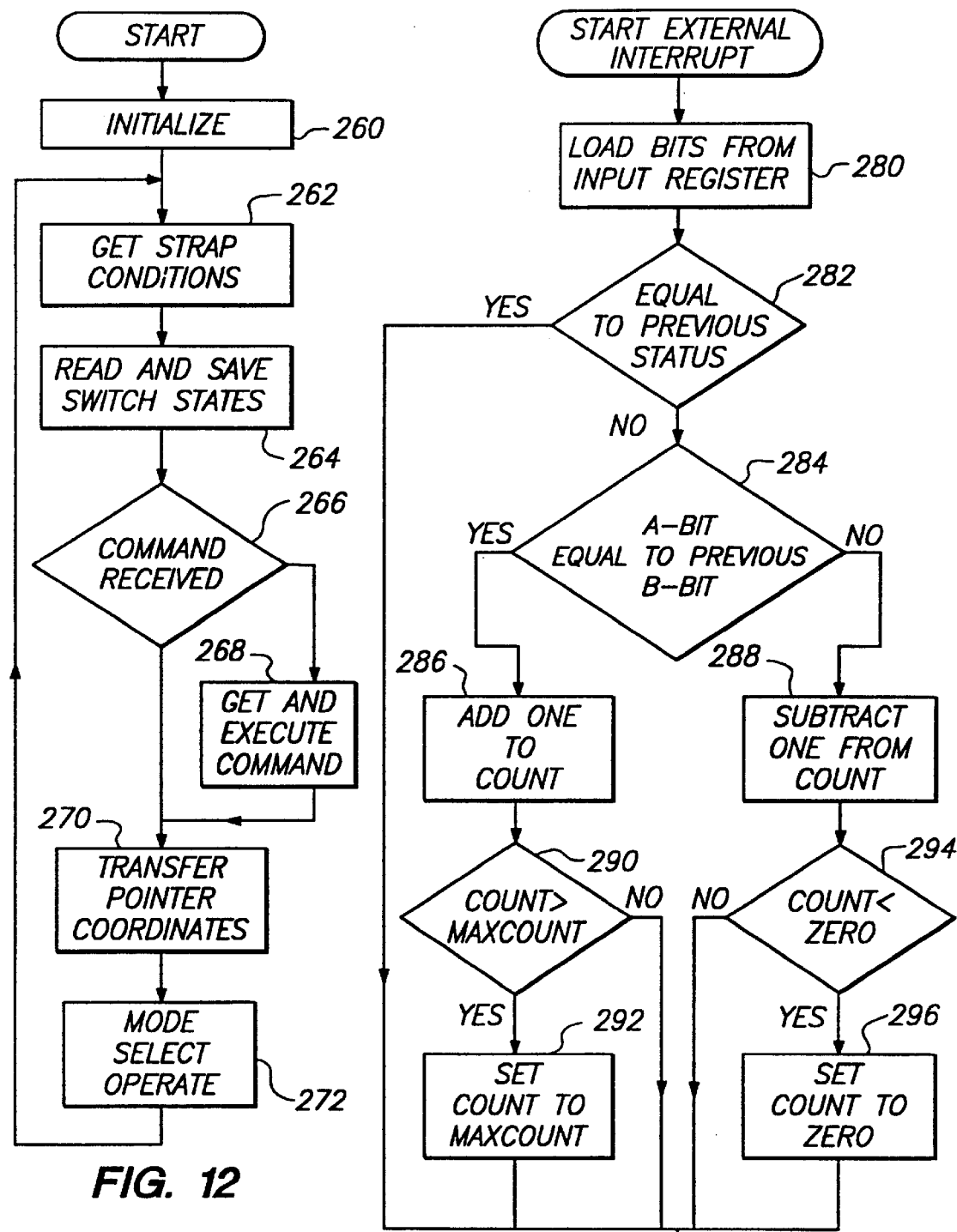

COMPUTER DISPLAY CURSOR CONTROLLER

FIELD

The present invention relates to computer control devices, and particularly, to data entry devices that are used for one or more functions such as two or three dimensional control of a cursor or marker on a computer display, and selection of program control signals like macros, textual display, and selection of program control signals like macros, textual display selection, and others.

BACKGROUND

Known cursor controllers include cursor positioning keys (arrows), function keys, mice, track balls, joysticks, touch screens, light pens, tablets, and other devices for controlling cursor movement and selecting functions on menus that can be popped up in computer programs. Cursor movement control by these devices are generally satisfactory, but suffer from limitations such as being slow, requiring extensive arm movement, requiring a user to withdraw attention from the monitor to properly position the cursor, and other limitations. Additionally, some computer programs, such as spreadsheet or word processing programs use data files containing many pages of data that may be time consuming to scroll through to find a desired selection of data.

What is lacking in these known controllers is a mechanism to quickly and accurately position the cursor with respect to a user controller, and to quickly and accurately select data that the user wishes to manipulate.

SUMMARY

The present invention relates to computer control devices, and particularly, to data entry devices that are used for one or more functions such as two or three dimensional control of a cursor or marker on a computer display, and selection of program control signals like macros, textual display, and selection of program control signals like macros, textual display selection, and others.

A controller for controlling a computer display cursor includes an arena having a predefined optical grid. A puck handle is configured to move a puck on the optical grid and to reflect optical signals to the grid regarding the position of the puck on optical grid. The optical grid defines the resolution of the puck movements and positions that can be ascertained. Gratings formed by undulations in transparent walls provide an optical puck position signal in response to the puck position. A processor is coupled to the optical grid and is configured to receive the puck position signal and to generate a cursor position signal. To generate the cursor position signal, the processor may perform a conversion function based on predetermined criteria. The processor transmits the cursor position signal to a computer having a predefined display size, which displays the cursor at a respective position. Moreover, the processor may maintain puck movement parameters including puck velocity to generate a continuous movement signal when the puck is moved into an edge position. The processor may also may identify if the puck is positioned in a number of macro locations that are associated with user-selectable tasks.

Advantages of the invention include comfortable, quick and accurate positioning of the cursor by the user controller, and quick and accurate selection of data that the user wishes to manipulate.

BRIEF DESCRIPTION OF THE DRAWINGS

Additional advantages of the invention will become apparent upon reading the following detailed description and upon reference to the drawings, in which:

FIG. 6 is a plan view of a plate sliding member with quadrature grating facilities for detecting movement in one of the two dimensions of movement of the pointing device of FIG. 2 FIG. 7 is a cross-sectional view taken from the front of a portion of the quadrature grating detection facilities of FIG. 6;

FIG. 8 is a horizontal cross-sectional diagram showing the construction of gratings employed in a stationary member and a movable plate member of FIGS. 6 and 7;

FIG. 12 is a step diagram of a main computer procedure employed by a pointing device computer in FIG. 9;

FIG. 13 is a table illustrating quadrature-generated signals in one dimension generated by sensing circuitry in the pointing device of FIG. 9;

FIG. 14 is a flowchart of an interrupt procedure employed in the pointing device computer of FIG. 9 for maintaining a count indicating position of the pointing device in one dimension;

DETAILED DESCRIPTION

The present invention relates to computer control devices, and particularly, to data entry devices that are used for one or more functions such as two or three dimensional control of a cursor or marker on a computer display, and selection of program control signals like macros, textual display, and selection of program control signals like macros, textual display selection, and others.

Exemplary embodiments are described herein with reference to specific configurations. Those skilled in the art will appreciate that various changes and modifications can be made to the exemplary embodiments while remaining within the scope of the present invention.

Figure 1A:
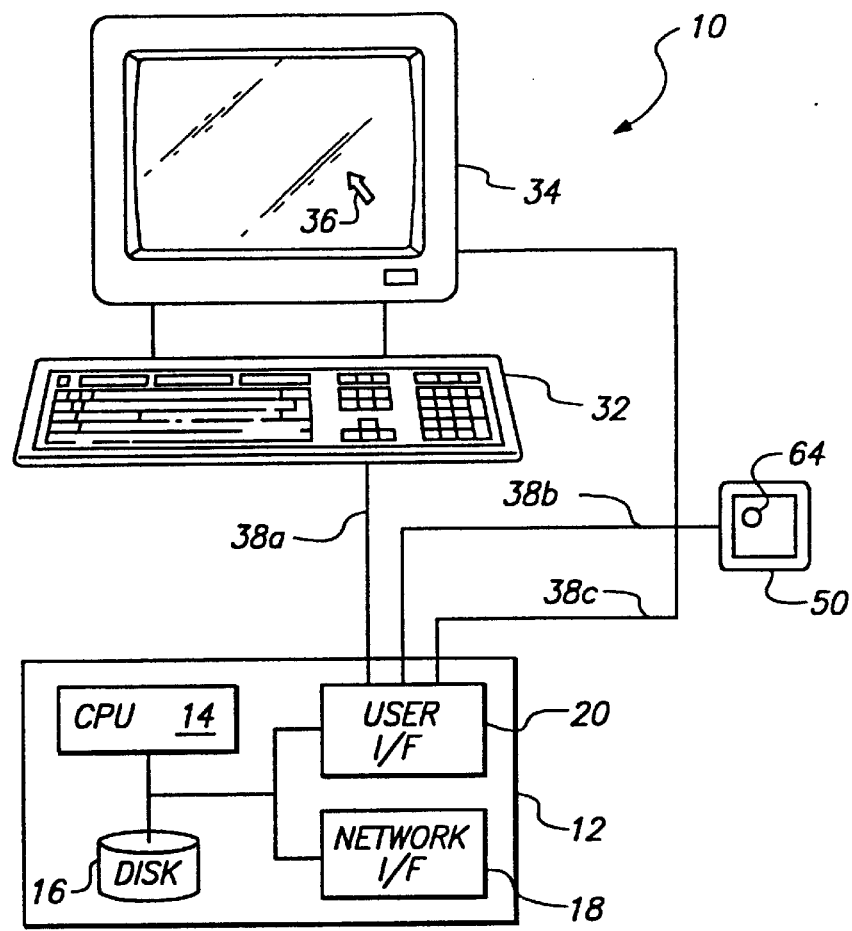
FIGS. 1A–B depict a computer system with a keyboard having a cursor controller according to an embodiment of the invention.

A first embodiment is described with reference to FIGS. 1A-B. FIG. 1A depicts a computer system 10 according to one embodiment of the invention. Similar computer systems are described in Kley, U.S. Pat. Nos. 4,935,728 and 4,782,327 incorporated herein by reference.

Computer system 10 includes a computer 12 that has a central processing unit (CPU) 14, a memory 16, a network interface 18 and user interface 20. Computer 12 is capable of running operating system software and operates device drivers that interpret signals from devices attached to the user interface 20. A keyboard, display, 34 and cursor controller (pointing device) 50 are all part of the user interface, and are coupled to computer 12 via cables 38a, 38b and 38c. Cable 38a is a standard 101 keyboard cable, cable 38b can be a serial cable (e.g. RS-232), a special mouse connector cable (e.g. PS/2 mouseport), a Mac ADB bus cable, or a bus mouse cable, and cable 38c is a VGA or SVGA video type cable. Display 34 has a cursor 36 shown as an arrow. The cursor 36 can be any of a variety of cursors including a character or a highlighted menu item. When the cursor controller 50 is manipulated, the cursor 36 moves on the display 34.

Figure 1B:
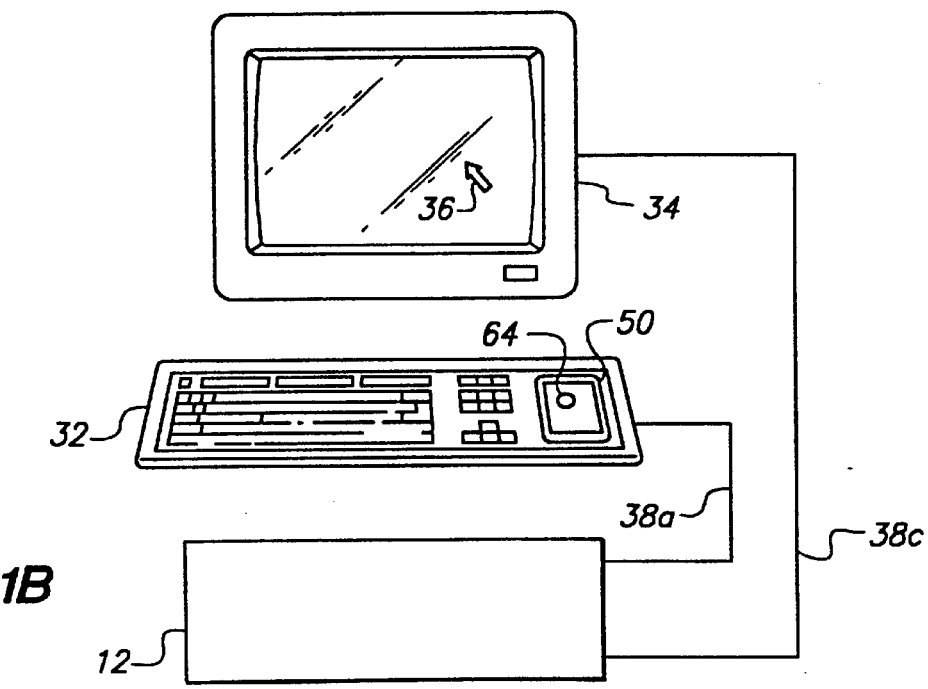

FIG. 1B depicts a computer system with a keyboard having an integrated cursor controller 50. Cursor controller 50 transmits puck position signals over cable 38a to computer 12.

CURSOR CONTROLLER

Figure 2:
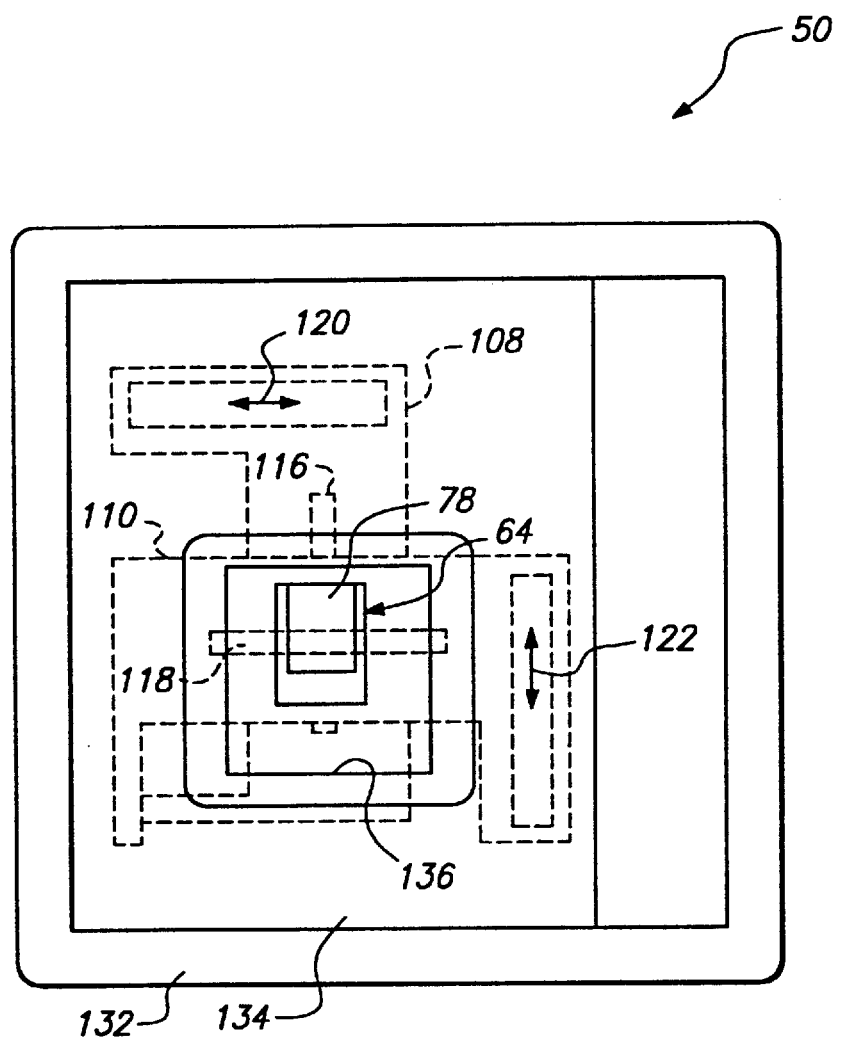
FIG. 2 is a plan view of a pointing device used in the computer system of FIG. 1.
Figure 3:
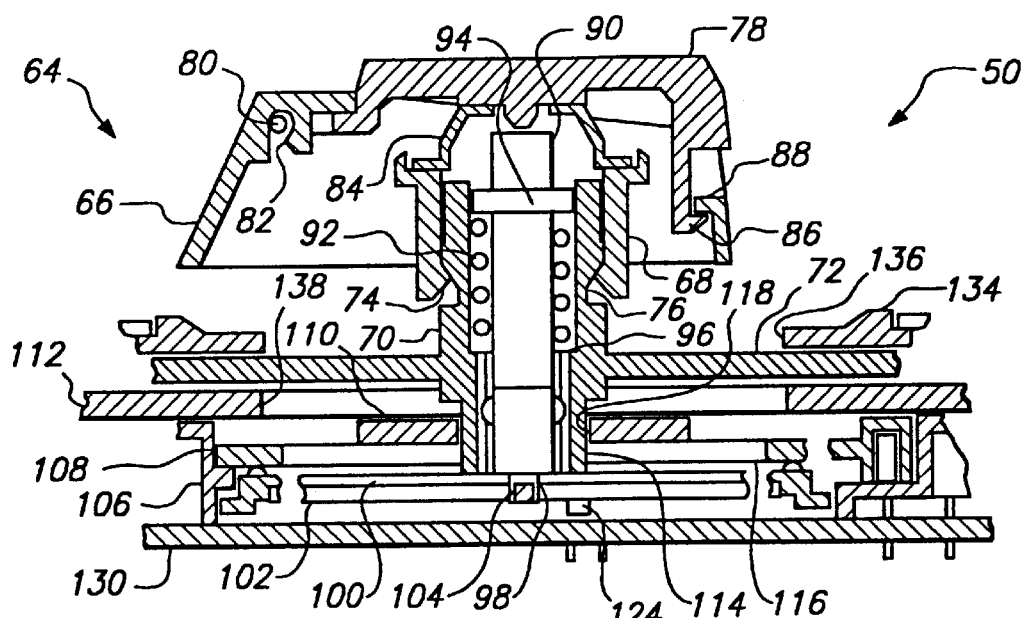
FIG. 3 is a cross-sectional view taken from the right side of a broken-away portion of the pointing device of FIG. 2.
Figure 4:
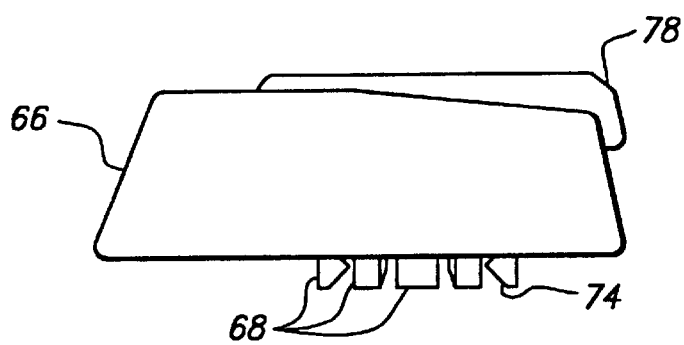
FIG. 4 is an elevation view taken from the right side of a handle member of the pointing device of FIGS. 2 and 3.
Figure 5:
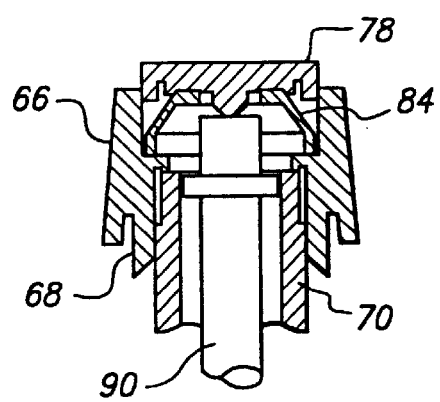
FIG. 5 is a cross-sectional view taken from the front of the upper handle portion of the pointing device of FIGS. 2–4.

The cursor controller 50, as shown in FIGS. 1–3 includes a puck 64, which may be gripped by the user's fingers, and moved within a rectangular or square horizontal area of movement, such as a 1 inch square horizontal area having a 323 by 323 optical grid. The puck 64 includes a molded handle member 66, see also FIGS. 4 and 5, which has a plurality of downward extending fingers 68 surrounding a tubular stem 70 extending upward from a slidable cover plate 72. Two of the fingers 68 include inward projections 74 which are resiliently interlocked with recesses 76 on the tubular stem 70 for retaining the handle member 66 on the stem 70. A switch button 78 has a pivot member 80 retained within snap recess 82 in a forward end of the handle member 66. A resilient tactile cone-shaped member 84 is interposed between the upper side of the center finger support of the handle portion 66 and the bottom side of the button 78 for urging the button 78 upward. The rear end of the button 78 has a projection 86 for engaging the underside of an inward-extending lip 88 of the handle portion 66 for limiting upward movement of the button 78 while permitting downward pivoting movement.

A pin member 90 is slidably mounted within the passageway of the stem 70 and is biased upward against the button 78 by a compression spring 92 which is interposed between a collar 94 on the pin 90 and an inner ledge 96 within the passageway of the tubular stem 70. A lower end portion 98 of the pin 90 has a reduced cross-section and extends through a slot 100 in a guillotine member 102 with inward extending lips 100 defining the slot being secured between the bottom end of the enlarged upper portion of the pin 90 and a pair of projections 104 extending beneath the lips 100. The guillotine member 102 is contained within a housing 106 along with a pair of sliding plate members 108 and 110 with a cover 112 secured on top of the housing. A downward projecting tubular portion 114 of the slide plate 72 has its outer periphery with a square configuration and extending through respective slots 116 and 118 in the lower and upper plate members 108 and 110. The lower plate member 108 is retained by walls of the housing 106 for sliding motion in one orthogonal direction 120, see FIG. 2, while the other plate member 110 is retained within the housing 106 for sliding motion in the direction 122. When the puck 64 is moved in the direction 122, the lower portion 114 of the member 72 slides freely within the slot 116, and when the puck 64 is moved in the direction 120, the lower portion 114 slides within the slot 118. The guillotine member 100 is slidable within the housing in the direction 120, while the lower portion 98 of the pin 90 slides within the slot 100 during movement of the puck 64 in the direction 122. However, the guillotine member 102 is movable in an up and down direction, as viewed in FIG. 3, so that when the button 78 is pressed the pin 90 is pressed against the bias of the spring 92 and the guillotine member 102 is lowered to interrupt a light path of light impinging upon a light sensor or phototransistor 124 from a light emitting diode 126, see FIG. 9.

A more detailed description of the structure and operation of the housing 106, slide plates 108 and 110, guillotine 100, cover 112, and slide member 72 is contained in Kley, U.S. Pat. No. 4,782,327. The housing 106, as well as the leads of the electrical components contained within the housing 106 are suitably mounted on a printed circuit board 130 which is in turn mounted in an enclosure 132, FIG. 2. The top wall 134 of the enclosure 132 contains a square opening 136 through which the stem 70 projects. The horizontal planar area of movement of the stem 70 is determined by the opening 136 and/or an opening 138 formed in the top 112 of the housing 106.

Each of the sliding plate members 108 and 110, as shown for the plate member 110 in FIGS. 6, 7 and 8, has an elongated head portion 140 which contains an longated groove 142 extending parallel to the direction 122 and into which extend a air of photodiodes 144 and 146. A stationary member 150, also mounted in the pointer housing, has a recess 152 with a pair of light sensors or phototransistors 154 and 156 mounted therein in alignment with the respective LEDs 144 and 146. The head portion 140 has an outer wall 160 extending parallel to the direction 122, while the stationary member 150 contains a wall 162 extending parallel and adjacent the wall 160. Gratings are created in the walls 160 and 162 for detecting puck movement by modulating light from the LEDs 144 and 146 to generate quadrature related signals from the phototransistors 154 and 156. Gratings in the walls 160 and 162 in the present embodiment are formed by molded undulations in the outer surfaces of the walls which are formed from a transparent plastic material, such as polycarbonate. As shown in FIG. 8, these undulations include valleys 164, first sloping side surfaces 166, hill top surfaces 168 and second sloping side surfaces 170, with the surfaces 164, 166, 168 and 170 being elongated or running vertically. The dimensions of the surfaces 164, 166, 168 and 170 extending in the direction 122 are all equal, except for one valley surface 172 formed in the wall 162 of the stationary member 150 between the photosensors 154 and 156; this wall portion 172 has a dimension in the direction 122 which is one-half of the dimension of the surfaces 164, 166, 168 and 170 in the direction 122 to thus form two gratings, which are phase-shifted 90 degree(s) relative to each other, on the member 162. As an example, 80 gratings per inch are satisfactory to provide good cursor control, while up to 1100 or more gratings per inch can be constructed if extremely fine control is desired.

Light passing through the wall 160 from the LEDs 144 and 146 is internally reflected when it strikes one of the sloping surfaces 166 or 170, but passes through the valley and hilltop surfaces 164 and 168 which are parallel to the direction 122 and perpendicular to the direction of light emitted by the LEDs 144 and 146. Light that passes through the wall 160 and is emitted from the surfaces 164 and 168 is partially reflected and partially refracted if it strikes one of the sloping surfaces 166 or 170 of the wall 162, but passes through the wall 162 to the corresponding phototransistor 154 and 156 if the light impinges upon one of the valley surface 164 or hill top surface 168 of the stationary member wall 162. Due to the light reflection and refraction, movement of the wall 160 in the direction 122 causes the light impinging upon the light sensors 154 and 156 to be modulated. Since the surfaces 164, 166, 168 and 170 of the member 162 in line with the light sensor 154 from the LED 144 are 90 degree(s) out of phase relative to the corresponding surfaces of the wall 162 in front of the phototransistor 156, the signals generated by the sensors 154 and 156 by movement of the slide member 110 will be 90 degree(s) out of phase with each other. One complete cycle is defined by a valley surface 164 and a first sloping side surface 166 passing a point while a second complete cycle will occur when the succeeding hill top and second sloping surface pass the point. Binary signals generated for 1 1/4 cycles are illustrated in FIG. 13.

Figure 9:
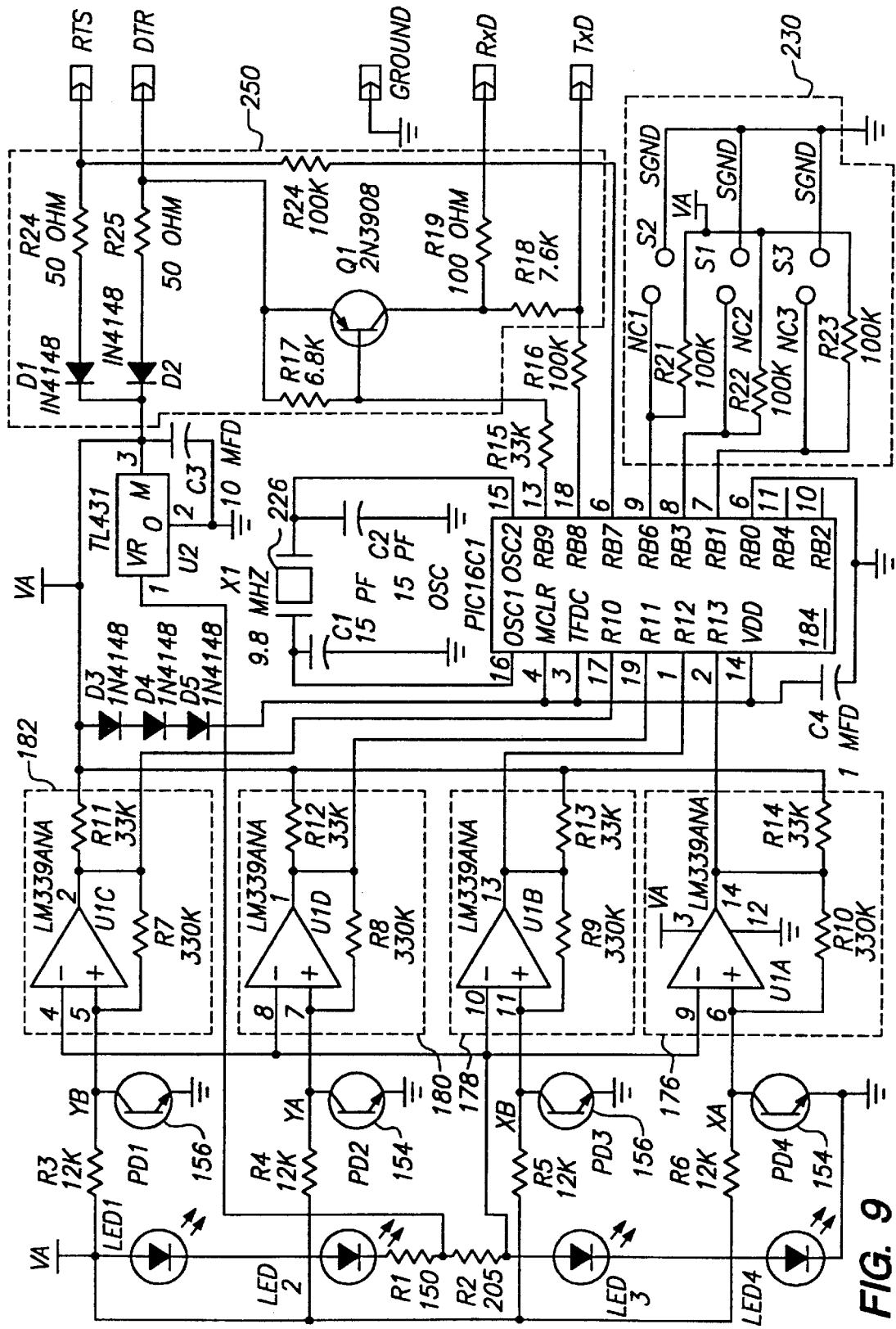
FIG. 9 is an electrical schematic of a circuit employed in the pointing device of FIGS. 2 and 3 for sending signals to a computer in the system of FIG. 1 to indicate position or movement of a puck in the pointing device.

The circuitry employed in the pointing device 50 is illustrated in FIG. 9 wherein the outputs of phototransistors 154 and 156 generating the respective phases A and B of the quadrature signals indicating movement in the corresponding X and Y directions of the respective sliding plates 108 and 110 are connected by respective auto gain circuits 176, 178, 180 and 182 to corresponding inputs of a computer 184 such as type MC16C54 integrated computer from Microchips Technology. The invert terminal of the auto gain circuits is coupled to the LED emitter circuit to bias the auto gain circuits to properly detect puck motion and avoid false detection. Moreover, each of the auto gain circuits includes an amplifier and feedback resistor, as common in many amplifier circuits. The auto gain circuits deliver a pulsed signal to the processor when the puck is moved by the user.

Processor 184 receives the pulsed signals from the auto gain circuits and counts the number of pulses. This correlates to puck motion and processor 184 temporarily stores this information. The processor 184 receives an input from a clock circuit 226 which has a frequency selected to read the quadrature inputs at a rate which exceeds the rate of generation during normal fast pointer movement, for example 12.5 kHz. The processor 184 also receives inputs from optional normally open push button switches 230, which are normally biased positive by resistances the associated resistors. These optional push button switches 230 are mounted on top of the enclosure 132 adjacent to the puck 64 so that the switches 230 may be readily operated by a finger of the operator. Any desired number of these switches 230 may be provided. Outputs of the processor 184 are connected to an interface circuit 250 that matches the impedance and drives the output signal over cable 38b. Processor 184 can generate any required output to computer 12. For example, the processor 184 includes a serial output which is connected by an interface circuit 250 to an output line 38b which is then connected to a serial port of computer 12. Additionally, processor 184 may receive instructions and information from computer 12 over serial line 38b.

CURSOR CONTROL PROCEDURES

A. Initialization And Main Program Loop

The computer 184 contains a ROM which contains its basic operating program. The main program loop of the computer 184 is illustrated in FIG. 12. Upon reset, step 260 instructs the computer 184 to perform an initialization of its ports, timer registers, and RAM locations used to store variables and constants utilized by the program. During initialization, the input buffers for the X and Y directions are initially set to one-half the maximum count, i.e., the puck is assumed to be centered within its area of movement.

From step 260, the program proceeds to step 262 which is the first step of the main program loop. In step 262, the condition of the straps 222 are detected to determine the particular mode of operation of the pointer and to set various flags and various constants used in the program required by the particular mode of operation, described below under MODES OF OPERATION.

In the next step 264 the condition of the switches, including the output of the phototransistor 124 which detects the condition of the handle button 78, together with the switches 230, 232, 234, 236 and 238 is detected and stored.

In step 266 the computer determines if a complete instruction, which may be formed by several data words, has been received in an input buffer, and, if so, the program branches to step 268 where the command is executed. The receiving of bytes over serial line 252 is generally handled by an interrupt procedure. The commands can change the serial baud rate, can change the operating mode or can change the rate or scale that the output bears to incremental movement of the puck. When a command changes the operating mode it will override the mode selected by the strap condition step 262. Thus, the user can command the pointer device 50 to generate an output signal on a scale and format which the user desires.

Following step 266 or step 268 if step 266 is true, the program proceeds to step 270 where pointer coordinates are transferred from an input buffer to a program buffer. An input count, or X and Y coordinates, are maintained in an input buffer in accordance with an interrupt procedure. However, since this count can vary based upon quadrature input readings during interrupts which occur at a rate of clock 226 which can be substantially faster than the cycle time of the program of FIG. 12, the program in step 270 reads this input buffer and stores the reading in a program buffer which is changed only during step 270 in the cycle of FIG. 12. Thus, the main computer program and its procedures are not affected by changes in the count occurring during movement of the puck during steps of the main cycle.

In the following step 272 the computer then examines the computer coordinates transferred in step 270 and makes the appropriate conversions in accordance with the mode of operation as determined by step 262 or 268, described below under MODES OF OPERATION. Also the program in step 272 transfers pointer coordinates, pointer differential, user differential, or user coordinates to an output buffer and initiates interrupt controlled procedures which operate either the quadrature outputs or the serial outputs of the computer 184.

B. Puck Motion Detection

The interrupt procedure for maintaining the input count from the quadrature input is illustrated in FIG. 14. Processor 184 samples the puck position at a rate sufficiently high to insure that puck movement is accurately tracked by the processor, for example 12,500 times per second. The sampling rate can be modified to accommodate different optical grid sizes, optical grid resolutions and various predicted motion rates of the puck.

In the first step 280, the quadrature inputs of computer 184 are read. In step 282 these inputs are then compared to the previous input and if the same, the program executes a return from interrupt to return to the program step where the interrupt occurred. If step 282 is false, the program then proceeds to step 284 where a determination is made about whether the count in the input buffer should be incremented or decremented, i.e., whether the quadrature input indicates that the puck is being moved in the positive or negative direction of the corresponding X or Y direction. In FIG. 13 there is illustrated the changes that can occur over 11/4 cycles of the A and B inputs of the X quadrature inputs. It is noted that the up direction is always characterized by the A bit being equal to the previous B bit, whereas the down direction always has the A bit not equal to the previous B bit. Thus, if the A bit is equal to the previous B bit in step 284 the program proceeds to step 286 where the count in the input buffer is incremented. Conversely, if the A bit is not equal to the previous B bit the program proceeds to step 288 where the count in the in the input buffer is decremented. From step 286, the program proceeds to step 290 where the count in the input buffer is compared with the maximum allowable count, e.g., 324, and if the count exceeds the maximum count the program proceeds to step 292 where the count is set at the maximum count. If the count was decremented in step 288, the program proceeds to step 294 where the count is compared with zero and if less will proceed to step 296 where the count is set to zero.

C. Execution Of Cursor Control Procedures

Figure 15:
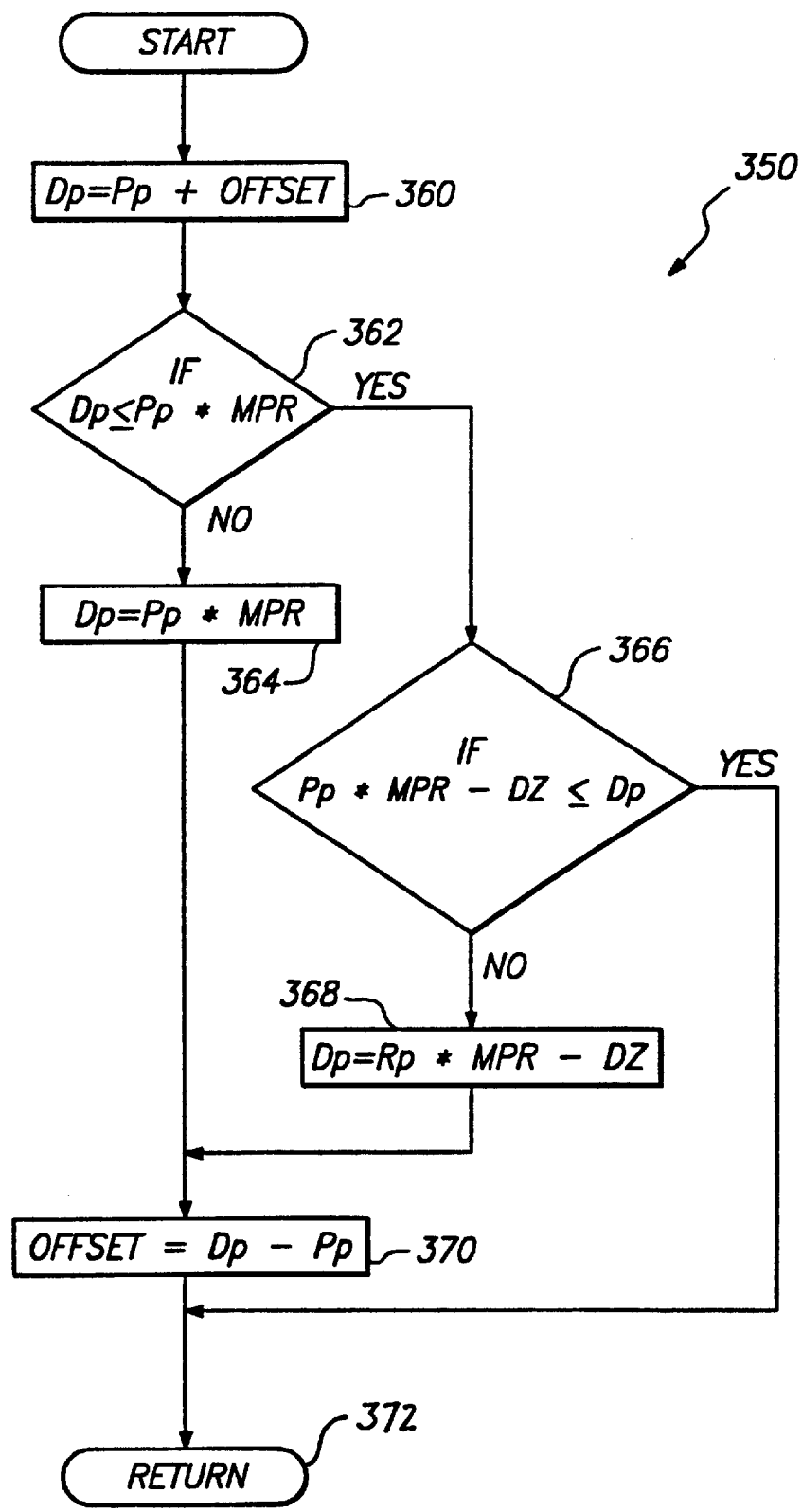
FIG. 15 is a flowchart of a cursor control procedure for determining a cursor position according to an embodiment of the invention.

FIG. 15 depicts a flowchart for providing cursor control. In this embodiment, the dimensions of the support optical grid are approximately one inch square. The relatively small area facilitates convenience by the user since the user is required to move the puck only a small distance to achieve a satisfactory movement of the cursor 36 on the computer display 34. In the one inch dimension, 316 grid partitions are created. By using the one inch dimension, the user can move the cursor 36 anywhere on display 34. Since a typical display is 480 by 640 pixels, processor 184 must compare the movement of the puck 46 on the grid 42 to convert puck movement to cursor movement. To accomplish this, a multiplier (MPR) is chosen. For example, a MPR of 2.025 would convert 316 to 640, and a MPR of 1.519 would convert 316 to 480. It is acceptable to have an X MPR and Y MPR that are different than one another. The point is that the MPR should be chosen to give accurate conversion from the optical grid 42 to the display size 34 so that the cursor 36 can be positioned where the user desires.

FIG. 15 is a flow chart showing operation of the cursor controller of FIG. 3. In step 360, the display position (Dp) is set to the puck position (Pp) plus an Offset (Of). The offset is determined by puck movement and the uncertainty of puck position on the optical grid relative to the cursor. In step 362, if Dp is less than or equal to Pp times a multiplier (MPR), then the procedure goes to step 366. MPR is discussed above and represents the ratio of the screen resolution to the arena grid resolution. If Dp is greater than Pp times MPR, step 364 sets Dp to Pp times MPR and sends the procedure to step 370. In step 366, if Pp times MPR minus differential zero (DZ) is less than or equal to Dp, then the procedure goes to step 372. DZ is an accommodation factor that accounts for overflow in the processor 184, and is defined as:

$$DZ = Maximum(Pp) * MPR - Maximum(Dp).$$

If Pp times MPR minus DZ is greater than Dp, step 368 sets Dp equal to a raw position (Rp) times MPR minus DZ. The raw position is simply the raw position where processor 184 detects the puck. This is based on the assumption that during startup, the puck was centered in optical grid. Step 370 sets Of to Dp minus Pp. Step 372 returns the procedure to the beginning step 360 to continue determining the puck position to generate the cursor position.

A pseudo-code way to write the procedure is as follows:

10 Dp=Pp+Of
20 If Dp <=Pp * MPR goto 50
30 Dp=Pp * MPR
40 Goto 70
50 If Pp * MPR-DZ <=Dp goto 80
60 Dp=Rp * MPR-DZ
70 Of=Dp-Pp
80 Return where Dp is display position, Pp is puck position, Of is offset, MPR is multiplier, and DZ is differential.

C. Modes of Operation

Another feature of the embodiment is that when MPR is chosen to have extra grid lines 42 beyond the boundaries of the display 34, the extended grid positions can be interpreted as the user requesting a large movement in the cursor position. For example, if a user is drafting a large figure that is larger than the display, the user can quickly and accurately move to another position on the figure that is beyond the portion of the workspace presented on the display 34. In this case, the processor 184 interprets the movement of the puck into the extended grid positions as requesting an accelerated cursor movement. For example, if MPR is chosen as 2.089, then the puck 46 can be interpreted as requesting up to 660 pixels. When the puck 46 is moved to the edge, into the extended grid area, the computer 12 is instructed to scroll the information projected on the display 34 in order to position the cursor 36 at a user desired location. When the user desired location becomes present on the display 34, the user moves the puck handle off the extended grid into the center of the arena and the scrolling stops. Then the user can move the puck handle to adjust the cursor to the user desired position. This feature can be accomplished by reserving an extended grid of approximately 5 grids that represent the edge area. This division creates an active area where the cursor tracks the puck movement and an edge area where the screen scrolling is performed.

Two modes of operation are anticipated: an absolute mode, and a relative mode. In the absolute mode the output corresponds to the position of the puck 64 within its rectangular area, for example, X Y coordinates. In a relative mode, the output generally corresponds to movement of the puck. The quadrature output modes are relative type modes. Additionally, the modes can be classified as either pointer modes or user modes. In a pointer mode the output will correspond to the actual count or differential in count from the last output stored by the processor 184 based upon changes made in the quadrature input signals. In user modes, the actual pointer count or the differential in pointer count is converted into a user scale, for example, by multiplying or dividing the actual count or differential. Additionally, user output modes can include a zoom mode wherein movement of the puck under certain conditions is translated into movement of the cursor or marker within a small portion or area and where incremental change in cursor position varies with a detected pointer rate of movement or a pointer position in an edge of its area of movement.

When the mode is absolute, processor 184 sends the present position to computer 12. If the puck is in the active area, the cursor tracks the puck very accurately. If the puck is positioned at the edge, a predetermined signal is sent to the computer 12 depending on the initial parameters. The predetermined signal may instruct the computer to scroll the screen if the computer workspace is larger than a single screen. The signal is sent at a rate of 100 times per second.

When the mode is relative, processor 184 calculates a change in puck position over time, or differential position (DDP). This is the velocity of the puck. The processor 184 stores the differential position (DDP) based on the velocity of the puck. In the relative mode, when the puck is positioned at the edge area, a signal based on the DDP is sent to the computer 12 depending on the initial parameters. The DDP signal may instruct the computer to scroll the screen if the computer workspace is larger than a single screen. The scrolling can be based on the velocity of the puck when it was moved to a position at the edge. For example, if the user quickly moves the puck to the edge, the screen scrolls quickly, while if the user slowly moves the puck to the edge, the screen scrolls slowly. This feature provides the user with an easily controllable scrolling feature. The signal is sent at a rate of 40 times per second.

An anticipated feature is one that permits the user to change modes. One aspect of this feature is enabled by the user changing a setting in the device driver to select desired modes. Another aspect of this feature is enabled by utilizing a button on the puck 64 to select desired modes. Another aspect of this feature is enables by utilizing a macro procedure, explained below, to select desired modes.

Note that steps 282, 284, 286, 288, 290, 292, 294 and 296 illustrate the maintenance of the count in one buffer or one coordinate direction, such as the X direction. These steps are repeated for each additional coordinate direction such as the Y direction.

MACRO PROCEDURES

Figure 10:
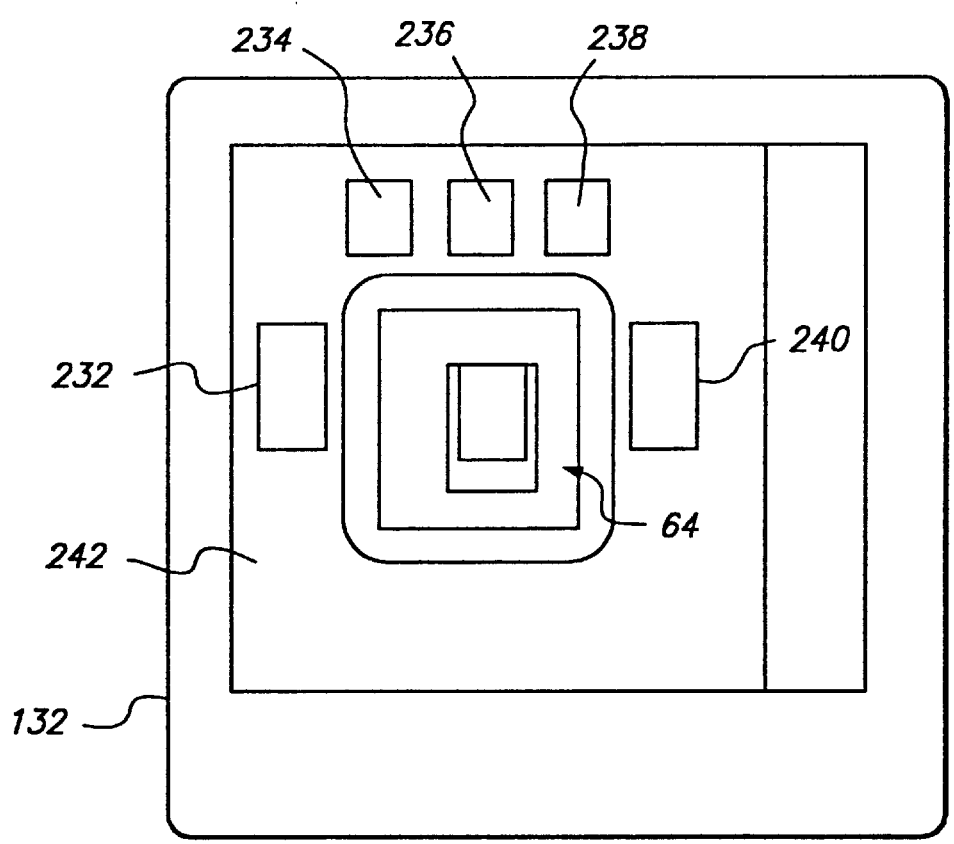
FIG. 10 is a plan view of a modified pointing device showing optional button switches for use with the circuit of FIG. 9.
Figure 11:
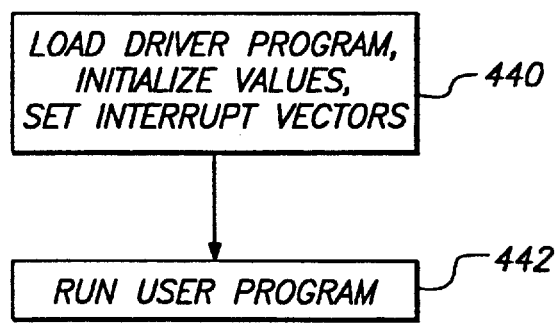
FIG. 11 is a flowchart showing general operation of the pointing device of FIG. 1 with a user program.
Figure 16:
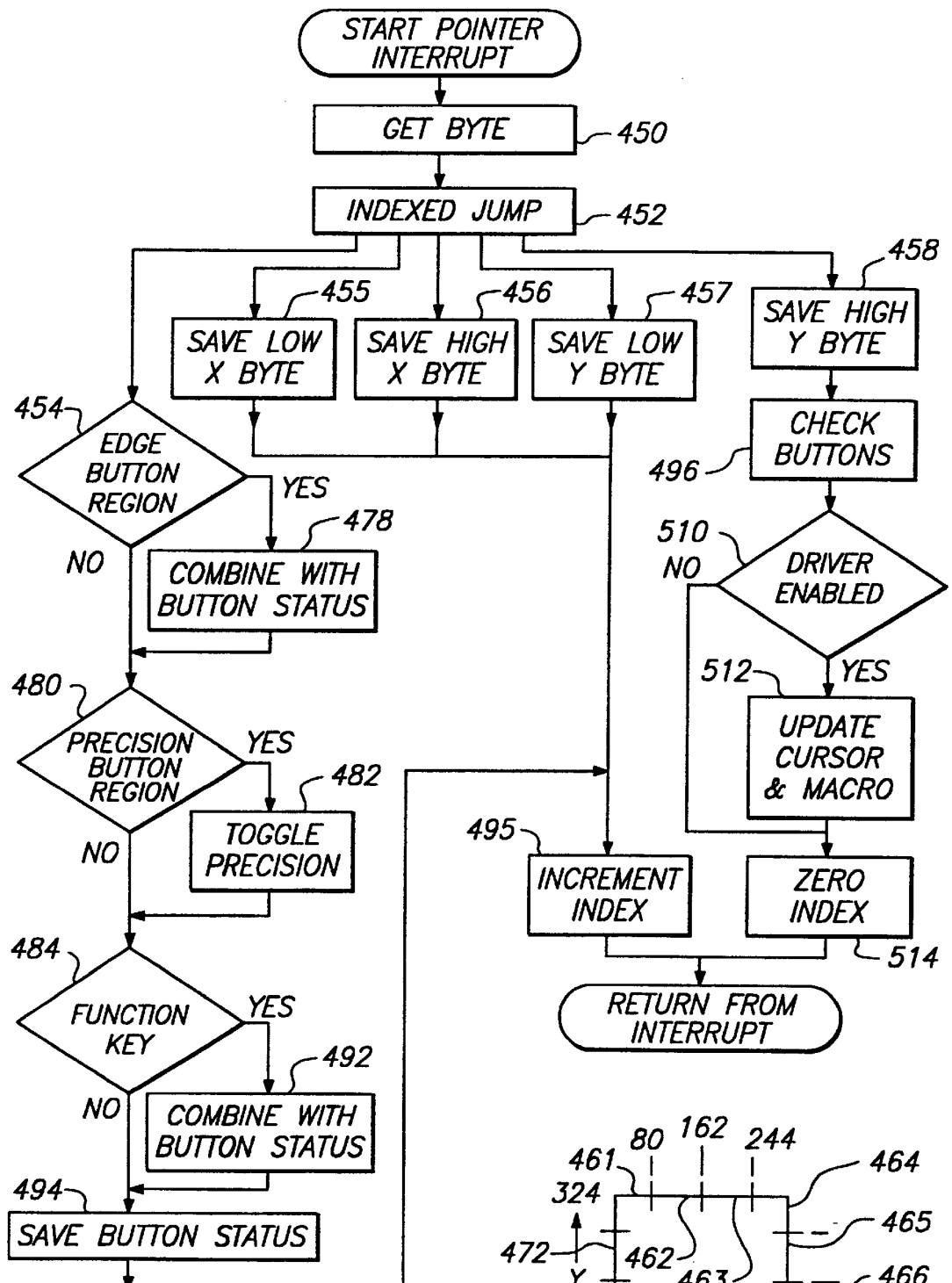
FIG. 16 is a serial pointer interrupt procedure employed in the main computer of FIG. 1 for receiving pointer information and for controlling cursor movement and passing control information to a user program.
Figure 17:
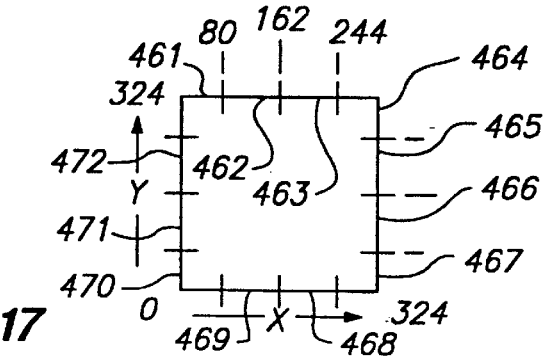
FIG. 17 is a diagram illustrating determination of edge regions of a pointer area of movement.

An interrupt program, shown in FIG. 16, is called when a serial byte is received over cable 54 from the pointer 50. This embodiment employs a sequence of five bytes sent by the pointer 50 wherein the first byte contains information concerning push button status on the pointer 50, the second and third bytes contain the respective low and high bytes of X pointer coordinate position, and the fourth and fifth bytes contain the respective low and high bytes of Y coordinate information. The procedure saves a count or index of the number of bytes received and after retrieving the byte from the input register in step 450 uses an indexed jump in step 452 to jump to one of the steps 454, 455, 456, 457 and 458 in accordance with whether the byte was the first, second, third, fourth or fifth byte of the series of bytes sent by the pointer device 50. The pointer device 50 has its straps set, or is commanded by serial transmission from the computer 52 during initialization step 440, such that the pointer device is in either the X, Y, Z mode to call step 388 of FIG. 16 to transfer pointer position coordinates to the output buffer upon a change in button status or position of the puck 64 or in an absolute freeze mode to call step 392 of FIG. 16 where the data from the pointer is a product of the pointer position coordinates times a user rate or step. In the particular procedure employed in FIG. 16, an embodiment of the pointer device shown in FIG. 2 is employed which does not include any of the membrane switches 232, 234, 236, 238 and 240 of FIG. 10. Instead, additional buttons, where desired by the user program, are designated by one or more edge regions. As shown in FIG. 17, the previous X and Y coordinate data received by the computer 52 from the pointer indicates a particular position of the puck 64 within a square area of movement. When the pointer is at an edge of its area of movement, for example when the X or Y value is equal to or less than 4, or equal to or greater than 320, then the pointer will be within one of twelve edge regions 461–472 defined around the periphery of the area of movement. These edge regions are selected so that four of the regions 461, 464, 467 and 470 are defined by the respective corners of the area of movement which are easy to determine by the user by feel in moving the puck 64 since the corners can be easily located. Further areas on either side of each corner area, such as edge regions 463 and 465 on the opposite sides of the corner region 464 are readily locatable by simply moving the pointer 78 from the corner 464 along the upper edge of movement to region 463 or along the right edge of movement to region 465. Thus, conveniently the regions along each edge can be formed by dividing the maximum coordinate lengths to four equal divisions; for example if the Y coordinate of the pointer is equal to or greater than 320, an X coordinate value between 0 and 80 indicates that the pointer is at edge region 461, an X coordinate value between 80 and 162 indicates that the pointer is in edge region 462, an X coordinate value between 162 and 244 indicates that the pointer is in edge region 463 and an X value greater than 244 indicates that the pointer is in edge region 464. Furthermore, pressing of one of several keys, such as the control key, the left shift key, the alternate key and the right shift key can be used to multiply the number of regions, for example to 60 possible edge regions. In this example edge regions 1–12 are defined with no keys depressed, edge regions 14–24 are defined when the control key is depressed, edge regions 25–36 are defined when the shift left key is depressed, edge regions 37–48 are defined when the alt key is depressed, and edge regions 49–60 are defined when the right shift key is depressed.

One or more of these 60 edge regions can be designated as a button region. Thus, step 454 determines if the pointer is in an edge region designated as a button, and if true, proceeds to step 478 where the button status information is changed to indicate that this edge button has been selected. This edge button region is utilized in the same manner as if one of the buttons 232, 234, 236, 238 and 240 of the embodiment of FIG. 10 had been depressed and this information contained in the first input byte.

From step 478 or step 476 if false, the program proceeds to step 480 where it is determined if a precision button region has been selected. One of the 60 edge regions can be designated as a precision button, which when selected proceeds to step 482 where the precision status is toggled. Precision status concerns fine and coarse cursor positioning modes. In the fine positioning mode the movement of the pointer 64 within its area of movement results in moving the cursor 58 within a small region, i.e., only a small portion of the total screen area of the display 58, so that the cursor 58 may be very precisely positioned, such as for use with forming drawings and the like on the display.

Figure 20:
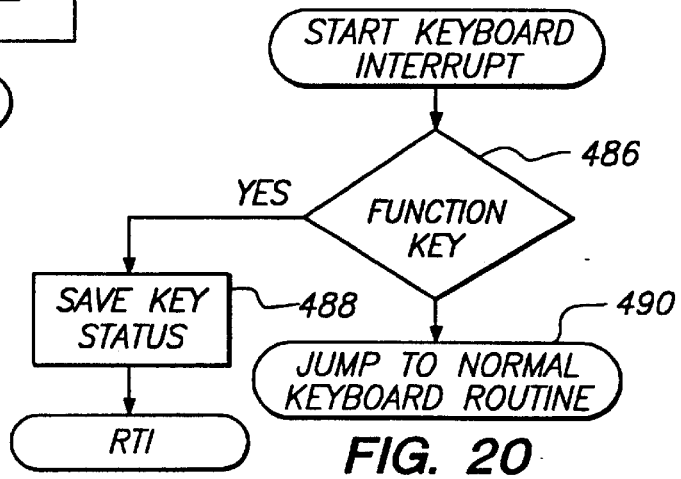
FIG. 20 is a step diagram of a keyboard interrupt program for incorporating operation of keyboard keys in the pointer operation.

In the next step reached after step 482 or step 480, if false, the status of one or more selected function keys is determined. This status results from a procedure illustrated in FIG. 20 and to which the normal keyboard interrupt of the computer 52 is directed by changing the corresponding vector during initialization. In the interrupt procedure the first step 486 determines if the interrupt was caused by pressing one of the selected function keys and if true proceeds to step 488 where this change in function key status is saved after which the program executes a return from interrupt. If a designated function key has not been selected then the program proceeds to step 490 where the interrupt procedure jumps to the normal keyboard routine handling the interrupt so that pressing of other keys are. Handled in a conventional manner. Referring back to FIG. 16, if the status recorded in step 488 indicates that a selected function key or keys have changed condition, then the program proceeds to step 492 where these function key changes are recorded and may be utilized as additional push button data or macro selection.

From step 492 or step 484 if false, the program proceeds to step 494 where the button status is saved, and then to step 495 where the index or count of the bytes received is incremented after which a return from the serial input interrupt is performed to return to the program where the interrupt occurred.

Upon receipt of the next byte, corresponding to the low byte of the X coordinate, the program of FIG. 16 jumps in step 452 to the step 455 where this byte is saved. From step 455 the program proceeds to step 495 where the index count is incremented. Similarly, steps 456 and 457 result in saving of the high byte of the X coordinate and saving of the low byte of the Y coordinate followed by incrementing of the index count in step 495.

When the last byte is received and saved in step 458 the interrupt procedure then proceeds to process the received information. The first step 496 following step 458 is a check button procedure which is illustrated in detail in FIG. 18. If in a first step 498 of the button procedure the program determines if a button status, such as the pointer button 78 or one of the function keys, has changed. If true, the program proceeds to step 500 where it is determined if a macro should be picked. A macro is an instruction or series of instructions to be sent to the keyboard buffer for use by the user program. If the pointer or puck 64 is in one of the 60 edge regions, and if the program is not waiting for the selection of a point after picking a macro, the program proceeds to step 502 where a macro picked flag is set. Certain macro instructions may require that the instruction be performed at a desired point on the screen. In that case, once the macro has been selected, step 500 is false and the program will proceed to step 504 where a subsequent button operation will result in a true and proceed to step 506 where a point picked flag is set. From step 502 or step 506 the program proceeds to step 508 where the pointer position or X and Y coordinates are saved for use by the user program. From step 508, step 498 if false, or step 504 is false, the program returns to the procedure of FIG. 16.

In step 510 the program determines if the cursor control and macro operating portions of the driver program are enabled and, if true, will perform the procedures of step 512 where positioning of the cursor or display marker is performed and where macro instructions are displayed and selected. Following step 512, or step 510 if false, the program proceeds to step 514 where the index count is reset to zero to ready the driver to receive the next sequence of data from the pointing device. From step 514 the program executes the return from interrupt to return to the program where the interrupt was called. Some user programs may utilize the values saved in steps 494, 455, 456, 457 and 458 for moving the cursor or marker and for performing program functions.

Figure 19:
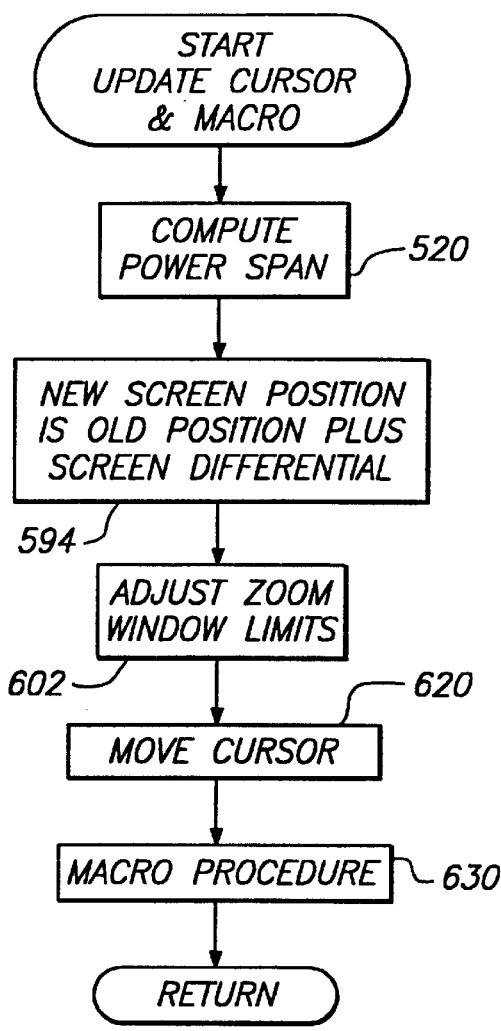
FIG. 19 is a step diagram of an update cursor and macro procedure employed in the pointer interrupt procedure of FIG. 16.

The main update cursor and macro procedure 512, as shown in FIG. 19 begins with step 520 which is a power span calculation procedure. The power span procedure basically determines the pointer differential by calculating the X and Y coordinates by subtracting the previous coordinates from the new coordinates just received in steps 455–458 of FIG. 16. The next step 594 determines whether the pointer 64 is within an outer ring of the pointer area movement. It is noted that the width of the ring has a value which is predetermined and which is selected in accordance with the user's desire to provide for full movement of the cursor or marker within the screen area while providing a sufficient area for fine cursor adjustment. If the pointer is within this outer ring, step 594 is true and the program sets a power span flag is set indicating a power span mode. The program then proceeds to step 602 where the program determines whether the particular application or user parameters call for a normal zoom procedure for fine cursor adjustment or a normal zoom procedure for normal cursor adjustment.

Figure 21:
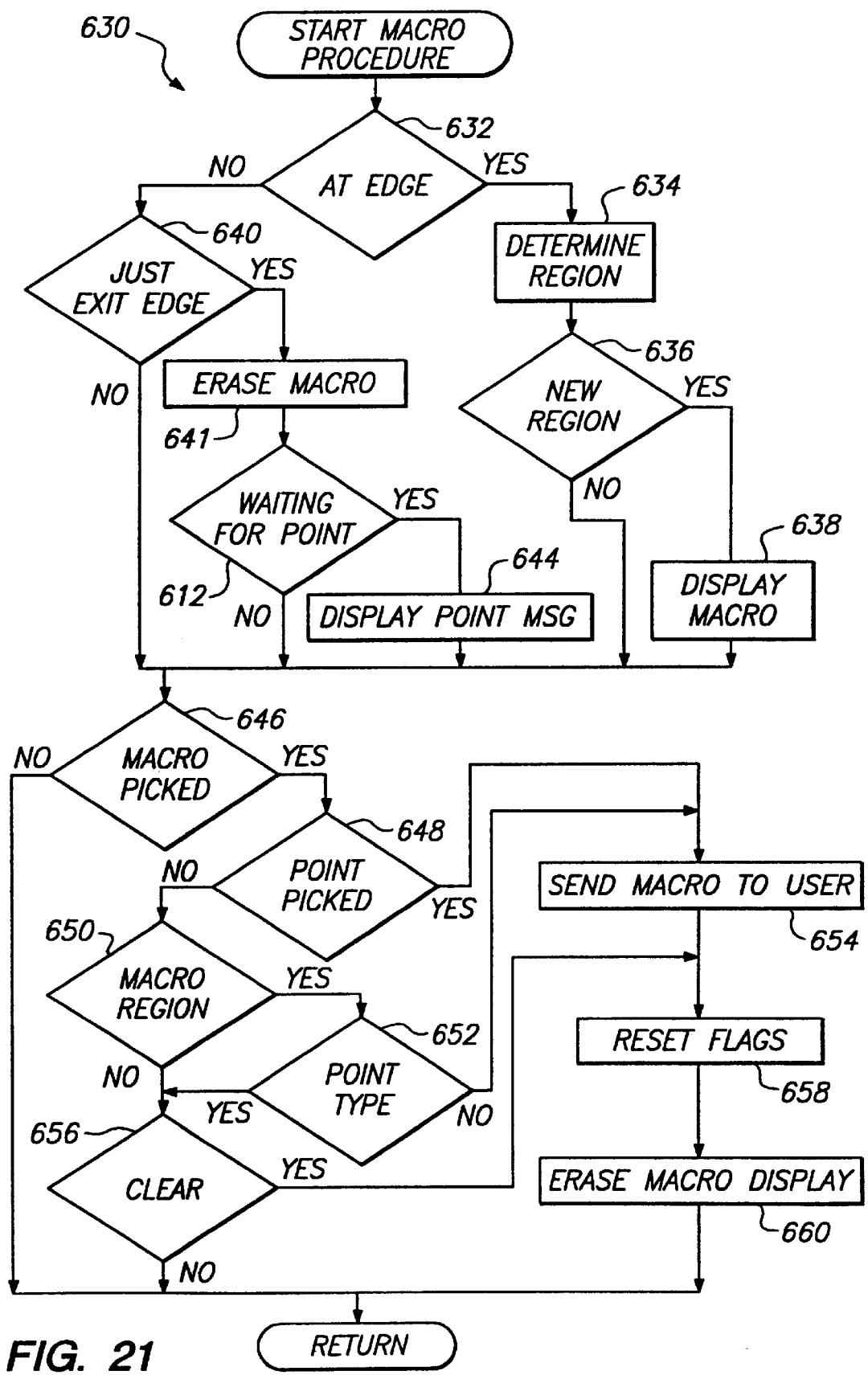
FIG. 21 is a step diagram of a macro procedure employed in the update cursor and macro procedure of FIG. 19.

Following the cursor adjustment, step 630 calls the macro procedure which is illustrated in detail in FIG. 21. In step 632 the program determines if the pointer 64 is at an edge of its area of movement, for example, if the X or Y coordinate is less than 4 or greater than 320. If true, the program proceeds to step 634 where the particular edge region among the 60 possible edge regions is determined as has been described above in connection with FIGS. 17 and 18. Then in step 636 it is determined if the pointer has moved into a new edge region and if true, the program proceeds to step 638 where a corresponding macro is displayed on the screen. The macros are contained within a memory file which is loaded during the initialization of the pointer driver. This file contains the actual text of the macros at locations as determined by an index table in the file. Each corresponding edge region is designated as being a macro with the corresponding text of the macro together with an indication indicating whether the macro requires specific point selection, indication if the edge region corresponds to a button together with information identifying the button, or indication if the edge region is a null region. For a null region, the step 638 will not display any macro.

If step 632 is false, the program proceeds to step 640 where it is determined if the pointer has just moved from an edge. If true, the program proceeds to step 641 where any displayed macro is erased and then to step 642 where it is determined if the program is now waiting for a point selection, i.e., a macro has been picked that requires a point and the pointer is being moved to select a point. If waiting for a point selection then the program proceeds to step 644 where a "point" message is displayed.

One procedure for displaying macros on the involves transferring the text of the macro to the keyboard input buffer of the computer operating system. This results in the macro being displayed on the command line of the program. Entry of a macro into the program generally requires sending an enter character such as by pressing the enter key or space bar. Thus, for displaying a macro, such characters will not be passed to the buffer so that the macro is not invoked in the user program until an enter character is passed to the buffer. Erasing the macro display is performed by passing destructive back space characters to the operating system keyboard buffer equal to the number of characters in the macro.

Figure 18:
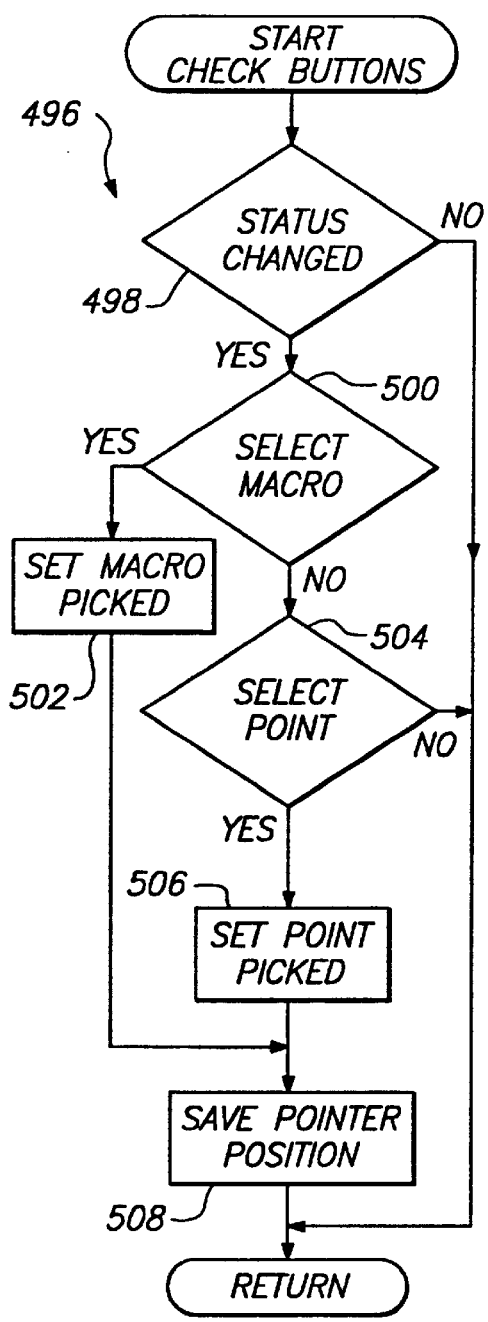
FIG. 18 is a step diagram of a check buttons procedure employed in the procedure of FIG. 16.

From step 638 or 644, or from step 636, 640, or 642 if false, the program proceeds to step 646 where it is determined if the macro picked flag is set, such as by the step 502 of FIG. 18. If a macro has been picked the program proceeds to step 648 where it is determined if the point picked flag has been set such as by step 506 in FIG. 18. If a point has not been picked the program proceeds to step 650 where it is determined if the edge region which has been picked is a macro region. If true, the program goes to step 652 where it is determined if the macro region is a point type macro region requiring the selection of a point prior to sending the macro to the user. If false from step 652 or true from step 648 the program proceeds to step 654 where the sending of the macro to the user program will be completed, for example, by transferring an enter character to the operating system buffer to actuate operation of the user program.

If step 650 is false or if step 652 is true, the program proceeds to step 656 where it is determined if there is a desire to clear any macro flags, for example a function key may be designated as a key for canceling any macro which has been picked but for which a point is required but not yet been picked. From step 656, if true, or from step 654 the program proceeds to step 658 where the flags such as the macro picked flag and the point picked flag are reset and then to step 660 where any macro display is erased in the same manner as performed in step 641. From step 660 or from steps 646 and 656 if false, the program return to the procedure of FIG. 19 and then to the procedure of FIG. 16.

Advantages of the invention include comfortable, quick and accurate positioning of the cursor by the user controller, and quick and accurate selection of data that the user wishes to manipulate.

ALTERNATIVE EMBODIMENTS

Having disclosed exemplary embodiments and the best mode, modifications and variations may be made to the disclosed embodiments while remaining within the scope of the present invention as defined by the following claims.

What is claimed is:

1. A cursor controller for controlling a computer display cursor and for use with a computer system having a central processing unit, a memory and a display, said cursor controller comprising:
   a controller structure having a predefined grid size for manipulation by a user and configured to generate a controller structure position signal in response to said manipulation;
   a processor coupled to said controller structure and configured to receive said controller structure position signal and to generate a cursor position signal; and
   a cable coupled to said controller structure and configured to transmit said cursor position signal to said computer system having a predefined display size for displaying a cursor at a respective position; and
   wherein said processor is configured:
   (a) to set a display position as a controller structure position plus an offset;
   (b) when the display position is greater than the controller structure position times a multiplier, to set the display position to the controller structure position times the multiplier and set the offset to the display position minus the controller structure position;
   (c) when the display position is less than or equal to the controller structure position times the multiplier and the controller structure position times the multiplier minus a differential zero is greater than the display position, to set the display position to a rough position times the multiplier minus the differential zero and to set the offset to the display position minus the controller structure position; and
   (d) to repeat procedures (a) to (c).

2. The controller of claim 1, wherein:
said controller structure includes an optical grid having a predefined optical grid size and a puck configured to move on said optical grid and to transmit optical signals to said optical grid regarding a position of said puck on said grid, and wherein said puck further has an optical signal generator and said optical grid has an optical signal receiver.

3. The controller of claim 2, wherein:
said puck and said optical grid have optically transmissive material with gratings on adjacent sides, said gratings affecting light transmission based on their relative positions.

4. The controller of claim 2, wherein:
said puck and said optical grid have optically transmissive material with undulations on adjacent sides, said undulations affecting light transmission based on their relative positions.

5. The controller of claim 1, wherein:
said display size is different from said predefined grid size.

6. The controller of claim 1, wherein:
said predefined grid size is 316 by 316.

7. The controller of claim 5, wherein:
said predefined display size is 480 by 640.

8. The controller of claim 5, wherein:
said processor includes a multiplier to generate said cursor position signal from said controller structure position signal.

9. The controller of claim 8, wherein:
said multiplier is approximately equal to the ratio of said predefined display size to said predefined grid size.

10. The controller of claim 1, wherein:
said processor sends a sustained cursor position signal when said controller structure is manipulated at an edge of said predefined grid size.

11. The controller of claim 1, wherein:
said processor sends a continuous cursor position signal when said controller structure is manipulated at an edge of said predefined grid size.

12. The controller of claim 1, wherein:
said processor stores a velocity value corresponding to a velocity of said controller structure, and when said controller structure is manipulated at an edge of said predefined grid size, wherein said processor utilizes said velocity value to generate said cursor position signal.

13. The controller of claim 1, further comprising:
a switch coupled to said processor and configured such that when placed in a first position said processor sends a sustained cursor position signal when said controller structure is positioned at the edge of the predefined grid size, and when placed in a second position said processor stores a velocity value corresponding to a velocity of said controller structure, and when said controller structure is positioned at an edge said processor utilizes said velocity value to generate said cursor position signal.

14. A controller for controlling a computer display cursor, comprising:
an arena having a predefined grid size;
a controller structure configured to move on said arena and to generate signals to said arena regarding a position of said controller structure on said grid;
wherein said arena is configured to generate a controller structure position signal in response to a controller structure position; and
a processor coupled to said arena and configured to receive said controller structure position signal, to generate a cursor position signal, and to transmit said cursor position signal to a computer having a predefined display size for displaying a cursor at a respective position;

wherein said processor employs a multiplier to generate said cursor position signal from said controller structure position signal; and wherein said processor is configured;
(a) to set a display position as a controller structure position plus an offset;
(b) when the display position is greater than the controller structure position times a multiplier, to set the display position to the controller structure position times the multiplier and to set the offset to the display position minus the controller structure position;
(c) when the display position is less than or equal to the controller structure position times the multiplier and the controller structure position times the multiplier minus a differential zero is greater than the display position, to set the display position to a rough position times the multiplier minus the differential zero and to set the offset to the display position minus the controller structure position; and
(d) to repeat procedures (a) to (c).

15. The controller of claim 14, wherein:
said multiplier is approximately equal to the ratio of said predefined display size to said predefined grid size.

16. The controller of claim 14, wherein:
said processor stores a velocity value corresponding to a velocity of said controller structure, and when said controller structure is manipulated at an edge of said predefined grid size said processor utilizes said velocity value to generate said cursor position signal.

17. The controller of claim 14, further comprising:
a switch that when placed in a first position said processor sends a sustained cursor position signal when said controller structure is manipulated at an edge of said arena, and when placed in a second position said processor stores a velocity value corresponding to a velocity of said controller structure, and when said controller structure is manipulated at an edge of said arena said processor utilizes said velocity value to generate said cursor position signal.

18. A method of controlling a cursor on a computer display, comprising the steps of:
(a) setting a display position as a controller structure position plus an offset;
(b) when the display position is greater than the controller structure position times a multiplier, setting the display position to the controller structure position times the multiplier and setting the offset to the display position minus the controller structure position;
(c) when the display position is less than or equal to the controller structure position times the multiplier and the controller structure position times the multiplier minus a differential zero is greater than the display position, setting the display position to a rough position times the multiplier minus the differential zero and setting the offset to the display position minus the controller structure position; and
(d) repeating steps (a) to (c).

19. The method of claim 18, further comprising the steps of:
(d) storing a velocity value of the controller structure position; and (e) when the controller structure is manipulated at an edge, setting the display position in relation to the stored velocity value.

20. The method of claim 18, further comprising the step of:
(d) when the controller structure is manipulated at an edge, setting the display position to scroll information on the display.

21. A controller for controlling a computer display cursor, comprising:
an arena having a predefined grid size;
said arena responsive to movement of a controller structure and configured to generate a controller structure position signal regarding a position of said controller structure on said arena; and
a processor coupled to said arena and configured to receive said controller structure position signal, to generate a cursor position signal, and to transmit said cursor position signal to a computer having a predefined display size for displaying a cursor at a respective position; and wherein said processor is configured:
(a) to set a display position as a controller structure position plus an offset;
(b) when the display position is greater than the controller structure position times a multiplier; to set the display position to the controller structure position times the multiplier and to set the offset to the display position minus the controller structure position;
(c) when the display position is less than or equal to the controller structure position times the multiplier and the controller structure position times the multiplier minus a differential zero is greater than the display position, to set the display position to a rough position times the multiplier minus the differential zero and to set the offset to the display position minus the controller structure position; and
(d) to repeat procedures (a) to (c).

22. The controller of claim 21, wherein:
said display size is different from said predefined grid size.

23. The controller of claim 21, wherein: said predefined grid size is 316 by 316.

24. The controller of claim 22, wherein:
said predefined display size is 480 by 640.

25. The controller of claim 22, wherein:
said processor employs a multiplier to generate said cursor position signal from said controller structure position signal.

26. The controller of claim 25, wherein:
said multiplier is approximately equal to the ratio of said predefined display size to said predefined grid size.

27. The controller of claim 21, wherein:
said processor sends a sustained cursor position signal when said controller structure is manipulated at an edge of said arena.

28. The controller of claim 21, wherein:
said processor sends a continuous cursor position signal when said controller structure is manipulated at an edge of said arena.

29. The controller of claim 21, wherein:
said processor stores a velocity value corresponding to a velocity of said controller structure, and when said controller structure is manipulated at an edge of said arena said processor utilizes said velocity value to generate said cursor position signal.

30. The controller of claim 21, further comprising:

a switch that when placed in a first position said processor sends a sustained cursor position signal when said controller structure is manipulated at an edge of said arena, and when placed in a second position said processor stores a velocity value corresponding to a velocity of said controller structure, and when said controller structure is manipulated at an edge of said arena said processor utilizes said velocity value to generate said cursor position signal. velocity of said controller structure, and when said controller structure is positioned at an edge, said processor utilizes said velocity value to generate said cursor position signal.

* * * * *